TELEPHONE RINGING CIRCUIT
Filed Jan. 13, 1967
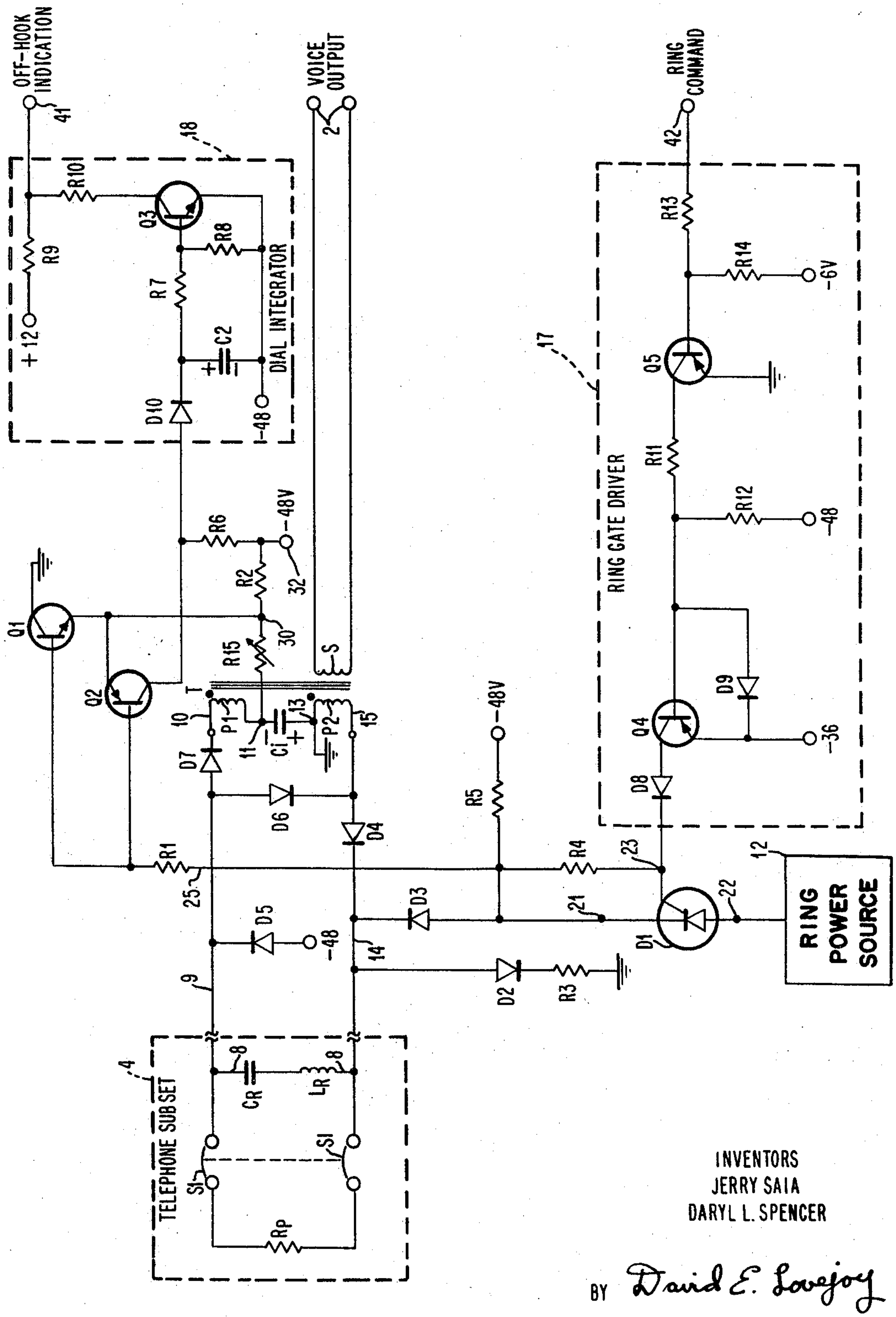
INVENTORS
JERRY SAIA
DARYL L. SPENCER
BY David E. Lovejoy
AGENT United States Patent Office 3,471,651
Patented Oct. 7, 1969

3,471,651
TELEPHONE RINGING CIRCUIT

Jerry Saia, Kingston, and Daryl L. Spencer, Woodstock, N.Y., assignors to International Business Machines Corporation, Armonk, N.Y., a corporation of New York Filed Jan. 13, 1967, Ser. No. 609,027
Int. Cl. H04b 5/00
U.S. Cl. 179—84 8 Claims

ABSTRACT OF THE DISCLOSURE

Disclosed is a ringing and off-hook indicating circuit including a local ring power source gated by an external ring command signal through an SCR to a telephone ringer. Diodes in the talking loop steer components of the ring current through each of the primary windings. An equalizing transistor establishes a substantially equal potential drop for each ring current component so that the ring-current-caused fields in the primary windings may be totally canceled. A bias transistor automatically removes ring power by inhibiting the turning on of the SCR during off-hook conditions and also supplies a signal to a dial integrator which produces an off-hook indication.

BACKGROUND OF THE INVENTION

This invention relates to signaling in telephone systems by means of ringing circuits including audio indicators and off-hook indicators. The audio indicators (bells, ringers, etc.) are included in the local telephone handset or subset and the associated off-hook indicator provides a signal to an external line scanner which inhibits ring command signals during the off-hook condition.

Prior art telephone subsets have most commonly employed audio indicators which have included a ringer requiring for energization a relatively high power signal of 20 c.p.s. The most common ringing circuits have employed mechanical relays for energizing the ringers. The mechanical relays, however, compared with solid state devices are a problem since they generally cost more and are of a lower reliability because of the maintenance associated with the relay contacts. The natural object, therefore, is to employ all solid state ringing circuits without mechanical contacts in order to improve the reliability and cost performance. In accord with that desire to employ solid state devices, the prior art use of solid state switching components in switching exchanges has presented the additional problem of compatibility with the commonly employed telephone subsets having high power ringers. The problem is that the high power that is required to energize the ringers in the subsets cannot be readily switched by solid state switching exchanges. It is desirable and an object of this invention, therefore, to have an all solid state ringing circuit compatible both with solid state switching exchanges and with high power ringers in local subsets. It is another object of this invention to have a ringing circuit which, besides controlling the energization of the relatively high power ringer, also automatically and quickly removes the ring current when the subset is in the off-hook (talking) condition. Still further it is desirable that the ringing circuit provide an off-hook signal when the subset is in the off-hook and dialing conditions. These and other features are embodied in the present invention which is briefly summarized as follows.

BRIEF SUMMARY OF THE INVENTION

The present invention is an improvement and modification of a common telephone system including a telephone subset. With reference to FIG. 1, the telephone system has a speech circuit commonly including the transformer T having a first primary winding P1 and a second transformer primary winding P2 separated by a blocking capacitor C1. The outer legs (10, 15) on the P1 and P2 windings are connected by lines to the telephone subset 4 which includes a ring line 8 having a ringer inductor LR in series with a ring capacitor CR. The subset further includes the off-hook switch S1 for connecting the voice subset impedance RP in parallel with the ring line during the off-hook condition.

The present invention includes the improvement of gating the local ring power source 12 to the ring line 8 by means of a gated unilateral conductor D1, e.g., a thyristor or silicon controlled rectifier (SCR). The gated conductor D1, hereafter described as an SCR, is turned on by a ring command signal applied at terminal 42 which may be amplified or otherwise modified (e.g. by the ring gate driver 17) in order to turn on the D1 gate 23. When the SCR is turned on, ring current is driven through the ring line and (a) through the first primary winding to a first potential level and (b) through the steering unilateral conductor D6 to the winding P2, and to a second potential level (shown as ground). The field established by the components of ring current in the P2 winding tends to cancel the field established by the component of the ring current in the P1 winding so that the effects of the ring current are either eliminated or minimized in the secondary winding S of the transformer T. The cancellation of the effects of the ring current in the winding S assures that noise from the ring current will not be propagated back through the switching exchange connected (not shown) to the winding S. Unilateral conductor D4 assures that the ring current will not bypass the ring on its way to the winding P2. Unilateral conductors D5 and D2 serve to discharge the ring capacitor during the periods when SCR D1 is not conducting. Unilateral conductor D7 serves to prevent discharging through the first winding P1 and thereby prevents the generation of an uncanceled noise signal which would otherwise be induced from the P1 winding to the S winding.

Further features of the invention include the potential equalizing transistor Q1 which is turned on when the SCR D1 conducts ring current thereby establishing the inner leg of winding P1 at a potential near ground, the same potential that the inner leg of the winding P2 is connected to. Accordingly, the components of ring current passing through the winding P1 and P2 are driven by substantially the same potential difference and are substantially equal so that substantially full cancellation of the fields occurs. A resistor such as variable resistor R15 may be added to further adjust or de-adjust the field cancellation.

Another feature of the invention are the base and emitter connections of transistor Q2 which couples the Q1 emitter voltage to the cathode of the SCR D1. When the off-on hook contacts S1 are closed during an off-hook condition, the voltage level passed through the emitter to base coupling of Q2 is such that it prevents the cathode of D1 from going more negative than the D1 gate. Without the cathode going more negative than the gate, the SCR cannot conduct and under that condition, ring current is inhibited. Additionally the collector output of Q2 indicates the on-hook, off-hook condition of the switches S1.

A still further feature of the invention is the dial integrator 18 which functions to assure that the off-hook indication at the collector of Q2 is constant even when the switch S1 (or a similar switch) is being opened and closed during dialing.

It is evident from the above summary of the invention that a ringing circuit is provided which, while being all solid state, is compatible with solid state switching exchanges and which is further compatible with high power ringers. Additionally, in this invention, the off-hook response as controlled by the coupling transistor Q2 automatically and quickly removes the ring power when an off-hook condition is detected. Still further, the circuit has the feature that, when the ring circuit is not being utilized, there is low power dissipation throughout the ringing circuit. Still additionally, the ring cycle is controlled continuously by an external ring command signal so that variable ringing sounds can be created by varying the length of any given ring or pause between rings. This feature is particularly advantageous when using the telephone subset as a signalling device capable of any number of different ringing sequences.

The foregoing and other objects, features and advantages of the invention will be apparent from the following more particular description of a preferred embodiment of the invention as illustrated in the accompanying drawing.

BRIEF DESCRIPTION OF THE DRAWING

The figure depicts a circuit diagram of a preferred embodiment of the present invention.

DESCRIPTION OF THE PREFERRED EMBODIMENT

Although the details of the connections of the various components of the present invention are apparent from the circuit diagram of the figure a brief description of the basic features will be identified. Briefly, the telephone system includes a transformer T having a secondary winding S and a first primary winding P1 and a second primary winding P2. The winding S is connected to the voice output terminals 2 which connect to a switching exchange or other telephone circuitry (not shown) well known in the art for feeding speech signals to telephone subsets. The primary windings, P1 and P2, connect the S winding to telephone subset 4. The subset includes a ring line 8 having in series a ring inductor LR and a ring capacitor CR. The switch S1 is controlled by the on-hook and off-hook condition of the subset and functions to connect the subset impedance RP in parallel with the ring line 8. The ring line 8 is connected by a first line 9 to a first outer leg 10 of the first winding P1. In a similar manner the ring line 8 is connected by a second line 14 to a second outer leg 15 of the winding P2.

In the preferred embodiment, the ring power source 12 will consist of a standard AC source for energizing commonly used ringers, typically supplying 120 volts rms at 20 c.p.s. The ring power source 12 is connected to the ring line 8 by means of a gated unilateral conductor D1, such as a thyristor or the SCR as shown. The SCR anode 22 and cathode 21 conduct ring current to the ring line 8 when the appropriate gating signal is applied at the SCR gate 23 and when the appropriate phase of drive current is present.

A blocking unilateral conductor, diode D4, connects the outer leg 15 of the winding P2 to the ring line 8. Similarly, a steering unilateral conductor, diode D6, is connected form a point common to the interconnection of line 9, running to the outer leg of winding P1, and the ring line 8, running to the second outer leg 15 of winding P2.

Discharging means for discharging the ring capacitor CR include unilateral conductors, diodes D2 and D5, which are connected in the manner shown to lines 14 and 9, respectively.

The transistor Q1 is defined as an equalizing transistor in that it operates to connect the inner leg 11 of the winding P1 to a potential substantially equal to the potential to which the inner leg 13 of the winding P2 is connected.

The transistor Q2 functions as a coupling unilateral conductor and has conduction characteristics opposite to those of the equalizing transistor Q1. Transistor Q2 is connected base to base and emitter to emitter with transistor Q1. Although a transistor is preferred as the coupling unilateral conductor, it could be replaced by a diode if it were desired not to use the collector output to give an off-hook signal to the dial integrator 18. Without such a collector connection, the base-emitter junction of transistor Q2 functions as such a diode.

The dial integrator includes the capacitor C2 which is charged by a current from the collector of Q2 and which is forced by diode D10 to discharge through the resistors R7 and R8. The transistor Q3 establishes an appropriate output voltage level at the output terminal 41 thereby giving an off-hook or on-hook indication which may be sensed by a line scanner.

The ring gate driver 17 functions to deliver the ring command signal at input terminal 42 to the gate 23 of the SCR D1. An input pulse requesting that the ringer be energized turns Q5 on thereby turning Q4 on and applying a −36 volt level to the gate 23 of the SCR in a manner to be hereinafter described in more detail. Although a preferred ring gate driver has been shown in the figure, those skilled in the art will realize that there are equivalent circuits which may be employed. For example, if the ring command signal itself at terminal 42 switches between the appropriate levels required to be applied on the SCR gate, then no ring gate driver will be required. Alternatively, the ring command signal applied at terminal 42 could feed a ring gate driver including an oscillator circuit transformer coupled to the gate 23 of the SCR. With the oscillator turned off, the voltage would not be coupled and the gate would not be enabled. This latter circuit has the advantage of DC isolating the ring gate driver and associated circuitry from the rest of the subset circuitry.

While certain details have been pointed out above, other details are apparent from the figure and from the following chart denominating further functions and values of components within the circuit.

| | |
|---|---|
| $R_p$ | DC resistance of the telephone circuitry. |
| $C_R$ | Blocking capacitor normally used in the ringer. |
| $L_R$ | Ringer coil(s) normally used in the telephone. |
| $R_1$, 3K | $Q_1$ base drive. |
| $R_2$, 820 | Current limiting resistor. |
| $R_3$, 3K | $C_R$ recovery. |
| $R_4$, 1K | $D_1$ gate load. |
| $R_5$, 5.1K | $D_1$ load. |
| $R_6$, 5.1K | $Q_2$ collector load. |
| $R_7$, 12K | $Q_3$ base drive. |
| $R_8$, 1K | $Q_3$ off bias. |
| $R_9$, 1K | $Q_3$ collector load. |
| $R_{10}$, 3.9K | Do. |
| $R_{11}$, 20K | $Q_4$ base off bias. |
| $R_{12}$, 10K | $Q_4$ base on bias. |
| $R_{13}$, 5.1K | $Q_5$ base off bias. |
| $R_{14}$, 5.1K | $Q_5$ base on bias. |
| $R_{15}$, 0-150 | Ring current balancing. |
| $C_1$, 5uf | DC blocking capacitor. |
| $C_2$, 22uf | Dial pulse integration. |
| $Q_1$, 084 | Ring voltage cancellation. |
| $Q_2$, 047 | Off hook detector. |
| $Q_3$, 084 | Dial pulse integrator. |
| $Q_4$, 047 | Ring driver. |
| $Q_5$, 047 | Ring integrator. |
| $D_1$, 2N1599 | Ring control thyristor. |
| $D_2$ | $C_R$ recovery. |
| $D_3$ | Isolation. |
| $D_4$ | Ring current blocking. |
| $D_5$ | $C_R$ recovery. |
| $D_6$ | Ring current division. |
| $D_7$ | $C_R$ recovery current block. |
| $D_8$ | $Q_4$ protection from high voltage. |
| $D_9$ | Diode emitter protection. |
| $D_{10}$ | Dial pulse integration. |
| T | Line transformer. |

OPERATION

The circuit of the figure is designed to energize the ringer associated with the inductor LR in ring line 8 by means of a ring current from ring power source 12. Employing the values in the above chart, a +6 volts ring command signal is applied at input terminal 42 and if the subset 4 is in the on-hook condition, that is, switch S1 is open, the ringer is energized. Whenever the ring command signal at input terminal 42 goes to approximately 0 volts, no ringing occurs. Whenever the subset is taken off-hook (switch S1 closed) then even with a ring command signal at input terminal 42, no ring current from ring power source 12 is passed through the ring line 8. Whenever the subset is in the off-hook condition, communication may occur undisturbed between the transducer RT and the terminals 2 or vice versa over the transformer T. When in the off-hook condition or in momentary on-hook and off-hook periods while dialing, an off-hook indication is given by an output signal near 0 volt on output terminal 41 of the dial integrator 18. During the on-hook condition, the output at terminal 41 is near 12 volts.

If a ring command signal going from 0 to +6 volts is applied at input terminal 42, then the base of transistor Q5 switches from approximately −3 to 0 volt sharply reducing the emitter-collector current through Q5. The change in Q5 causes the base of Q4 to jump sharply negative thereby forcing Q4 into saturation. In saturation, the −36 volts at the emitter of Q4 is applied to the gate 23 of SCR D1. The diodes D8 and D9 merely serve to protect the transistor Q4 from undesirable voltage or current swings.

With the telephone subset in the on-hook condition (S1 open), the circuit running from the emitter Q4 through D8, R4, and R5 establishes the gate 23 positive with respect to the cathode 21 thereby setting the gate. Assuming for purposes of explanation that the ring power signal at the anode 22 is in its negative half cycle going positive, the SCR will turn on when the anode gets to the gate voltage of −36 volts. Although −36 volts has been used as an exemplary value for the emitter voltage on Q4, that value is not critical as long as it is less than −20 volts. Whatever the value selected, the SCR turns on when it reaches that value which is for the purposes of this example −36 volts. Between −36 volts and ground, Q1 begins to conduct because of the coupling of the cathode 21 via line 25 and resistor R1 to the base of Q1. As the base of Q1 tends to follow the cathode of the SCR D1, the emitter of Q1 follows that voltage until it becomes clamped near ground. As the cathode 21 and the base Q1 go more positive, the emitter of Q1 remains clamped near ground thereby equalizing the potential level at terminal 30 between R15 and R2 near ground. Accordingly, the inner leg of 11 of the winding P1 is essentially at ground potential which is substantially equal to the potential level of the inner leg of winding P2. As the cathode 21 is driven more positive than ground by the ring power source 12, ring current is conducted from the ring power source 12 through the SCR D1 through the diode D3, to the ring line 8, down the line 9 to the diodes D6 and D7. One first component of ring current passes through the diode D7 and the winding P1 to the essentially ground potential level of the inner leg 11 of the winding P1. The other component of ring current, substantially equal to the first component, passes through diode D6, through the winding P2 to the ground potential level. Since the windings P1 and P2 are wound in the same direction as indicated by the dot convention and since the components of ring current are traveling in the opposite directions in the windings, the fields created tend to cancel each other. Therefore, no noise is created in the secondary winding for propagation back through the switching exchange.

The ring current passing through ring line 8 during the positive half cycle charges the capacitor CR which is discharged through diodes D5 and D2 as the ring current goes back into the negative half cycle.

With the ring command signal of +6 volts still applied to the input terminal 42 and with the subset 4 still in the on-hook condition, the SCR D1 stops conducting when the ring power source 12 drops below −36 volts during the negative half cycle of the ring power signal. During the negative half cycle, the ring capacitor CR is discharged, as indicated, in preparation for the forthcoming positive half cycle of ring power. As the ring power goes more positive, the SCR again turns on when it reaches the −36 volt level and the cycle previously described is repeated.

When the subset is in an off-hook condition, the switch S1 is closed thereby connecting the subset impedance RP in parallel with the ring line 8. This connection renders the subset in a condition for talking, and therefore, it is not desirable that the ringer be in operation. For example, the ringer may have been energized at the initiation of a ring command signal to indicate that a caller wishes to speak with someone on the subset 4. When a person answers the subset 4, the off-hook switches S1 are closed and it is desirable that the ringer stop ringing very quickly.

The stopping or inhibiting of the ringing is accomplished in response to a DC current which flows from the ground potential at the inner leg 13 of winding P2, through diode D4, RP, and the switch contacts S1, through diode D7, winding P1, resistor R15, and resistor R2 to the −48 volt potential at terminal 32. Before the S1 contacts were closed, the DC current was prevented from flowing by the isolation capacitors CR and C1 and the open contacts S1. The DC current establishes, when there is no ring current, a biasing level of approximately −15 volts at terminal 30 which is in common with the emitter Q1. Under the conditions of no ring current and the contacts S1 open, terminal 30 is approximately at −48 volts. The −48 volts when coupled through the base emitter of transistor Q2 does not prevent the cathode 21 of the SCR from going more negative than the gate 23. However, when the voltage at terminal 30 is established as −15 volts, that −15 volts potential level is coupled through the base-emitter of transistor Q2 preventing the SCR gate 23 from going more positive than the cathode 21. Of course, the terminal 30 when the contacts S1 are closed tends to follow the voltage of the SCR cathode 21 during a positive half-cycle swing and therefore, the ring line will continue to ring during the positive half cycle of ring current if the switches S1 have been closed after the SCR has started to conduct. The ringer will continue ringing during the positive half cycle, but the cathode 21 will be inhibited from going more negative than the gate 23 during the negative half cycle. Accordingly, ring power is removed within at least one-half cycle from the time that the off-hook condition commences. Of course, if the off-hook condition commences at a time when the SCR is not turned on, then it will never be turned on until an on-hook condition is again present.

With the S1 contacts closed and the SCR D1 inhibited from turning on, the −15 volts at terminal 30 operates with the voltage on the basis of Q1 and Q2 to turn Q1 off and Q2 on. With Q2 on, the terminal 30 voltage is coupled through the emitter collector of Q2 which is fed to the dial integrator 18. With Q2 on, the current from the collector in the dial integrator passes through diode D10, resistors R7 and R8 turning Q3 on thereby establishing an off-hook signal near 0 volt at output terminal 41. When Q2 is turned off and on in a rapid manner such as occurs during dialing, an off-hook signal is still present at output terminal 41 because of the integration capacitor C2. When Q2 is on, C2 charges to a potential level sufficient to maintain Q3 on when Q2 is momentarily turned off. Diode D10 assures that the capacitor C2 will discharge only through resistors R7 and R8.

Although the ring current balancing resistor R15 has been suggested as useful for making the components of ring current through the P1 and P2 windings equal, it can alternatively be used to de-adjust the currents by purposely making them unequal. The unequal or mismatched currents will cause a "noise" signal in the S winding which will be propagated into the system attached at terminals 2. This noise signal is not necessarily undesirable as it may be utilized when the ring power source is suitably modulated to give the party calling subset 4 a ringback signal, that is, an indication that the ringer is being energized as desired. In the preferred embodiment, however, the resistor R15 is adjusted to balance (approximately 75 ohms) the component currents. The task of introducing a ringback signal, if desired, is left to a separate ring-tone generator (not shown) which is introduced at a suitable place in the circuitry.

Another feature of the invention is that the ring current is "disconnected" when there is substantially no current through the ring line 8 thereby assuring that high voltage transients will not be generated. In comparison, many prior art relay-operated contacts for disconnecting ring power open at a time when ring current and voltage are relatively high thereby causing transients which increase the switch contact wear.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A telephone system including first and second transformer windings having first and second center legs connected by a capacitor and connected to first and second potential levels, respectively; a ring line, including a ringer in series with a ring capacitor, connected between a first line running to a first outer leg of the first primary winding and a second line running to a second outer leg of the second primary winding; wherein the improvement comprises, a ring power source, a gated unilateral conductor connecting said source to said ring line and operative to pass ring current through said ring line upon gating, a blocking unilateral conductor connected in said second line between said second outer leg and said ring line to prevent the ring current from bypassing said ring line, a steering unilateral conductor connected from a point common to an interconnection of said first line and said ring line to said second outer leg, said steering unilateral conductor steering a component of the ring current through said second winding, the ring current component in said second winding creating a field tending to cancel a field created by a component of the ring current passing through the first winding, discharging means for discharging said ring capacitor when said unilateral gate is not conducting ring current thereby conditioning the ring line for the next cycle of ring current.

2. The telephone system of claim 1 wherein said discharging means includes, a first discharging unilateral conductor connected between said first potential level and the point at an intersection of said first line and said ring line, and a second discharging unilateral conductor connected between said second potential level and said second line at a point in common with an interconnection of said second line and said ring line whereby a discharging current is passed through said first and second discharging unilateral conductors in a direction opposite the ring current at times when said ring current is not conducting.

3. The telephone system of claim 2 further including a second blocking unilateral conductor connected in said first line between said first outer leg and the point at an interconnection of said first line and said ring line whereby discharging current is prevented from flowing through said first winding.

4. A telephone system including first and second transformer windings each having a center leg serially connected by a capacitor having respectively first and second center legs connected to first and second potential levels, respectively; a ring line, including a ringer in series with a ring capacitor, connected between a first line running to a first outer leg of the first primary winding and a second line running to a second outer leg of the second primary winding; wherein the improvement comprises, a ring power source, a gated unilateral conductor including an anode and a cathode connecting said source to said ring line and including a gate operative to be turned on to allow the passage of ring current through said ring line, gate control means for applying a ring command signal to said gate to turn on said gate, a blocking unilateral conductor connected in said second line between said second outer leg and said ring line to prevent the ring current from bypassing said ring line, an equalizing transistor having its collector-emitter path connecting said first center leg to said second potential level and having its base connected to said cathode, a steering unilateral conductor connected from a point at an interconnection of said first line and said ring line to said second outer leg to steer a component of the ring current through said second winding to said second potential level, the ring current component in said second winding creating a field tending to cancel a field caused by a component of the ring current passing through the first winding to the second potential level via the collector-emitter path of the equalizing transistor, discharging means for discharging said ring capacitor when said unilateral gate is not conducting ring current thereby conditioning the ring line for the next cycle of ring current.

5. The telephone system of claim 4 further including a ring current balancing resistor connected in series between said first center leg and the emitter of said equalizing transistor, said resistor adjusting the equality of said ring current components.

6. The telephone system of claim 4 adapted to automatically inhibit the ring current when an off-hook switch connects a voice transducer in parallel with the ring line comprising, a second blocking unilateral conductor in said first line, a coupling unilateral conductor having its anode connected to the cathode of the base-emitter diode of said equalizing transistor and having its cathode connected to the anode of said base-emitter diode for coupling a bias voltage created by an off-hook current through a loop from said second potential level, said loop including the second winding, the blocking unilateral conductor, the voice transducer, the second blocking unilateral conductor, the first winding, and a bias generating impedance terminated at the first potential level to the cathode of said gated unilateral conductor thereby inhibiting the turning on of said gate.

7. The telephone system of claim 6 wherein said coupling unilateral conductor is a coupling transistor having base to base and emitter to emitter connections with said equalizing transistor and having a collector for indicating the on and off-hook condition of the telephone subset.

8. The telephone system of claim 7 further including dial integrator means connected to the collector of said coupling transistor for integrating the on and off-hook output signal created by the making and breaking of the off-hook switch during dialing so as to provide a constant off-hook signal during dialing.

References Cited

UNITED STATES PATENTS 2,990,454 6/1961 Delanoy.

KATHLEEN H. CLAFFY, Primary Examiner

WILLIAM A. HELVESTINE, Assistant Examiner